March 7, 1967  E. HATZ  3,307,655
MEANS FOR LUBRICATING A CRANK PIN OF A CRANK SHAFT
Filed Nov. 17, 1964  2 Sheets-Sheet 2

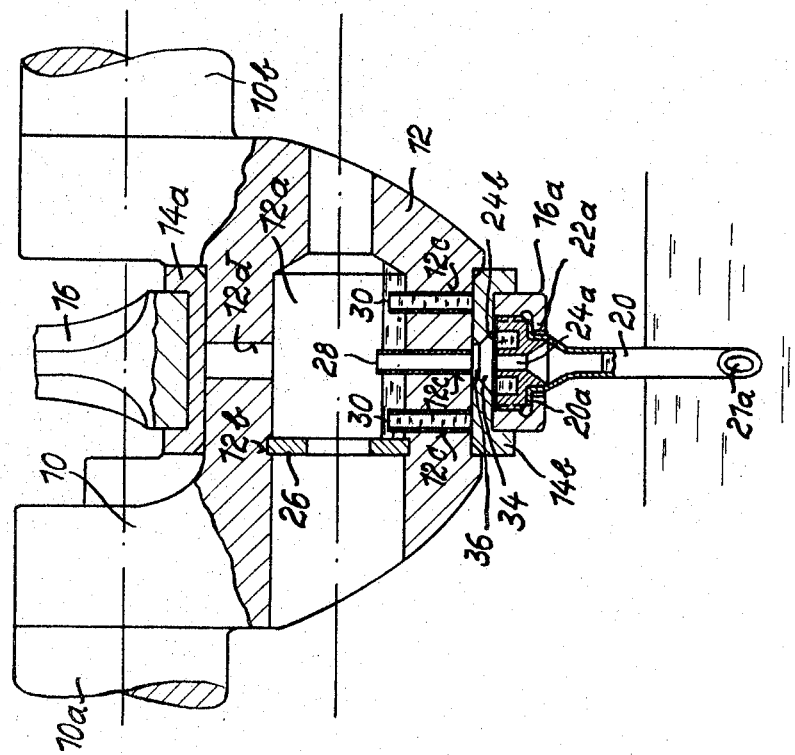

United States Patent Office 3,307,655
Patented Mar. 7, 1967

3,307,655
MEANS FOR LUBRICATING A CRANK
PIN OF A CRANK SHAFT
Ernst Hatz, Ruhstorf, near Passau, Germany, assignor to Motorenfabrik Hatz, GmbH., Ruhstorf, near Passau, Germany
Filed Nov. 17, 1964, Ser. No. 411,836
Claims priority, application Germany, Mar. 26, 1964, M 60,462
7 Claims. (Cl. 184—6)

This invention relates to means in an internal combustion engine for lubricating a crank pin of a crank shaft, i.e. the pin whereby a connecting rod is articulated to the said shaft.

The object of the invention is to solve the problem of lubricating such a crank pin from the oil sump, preferably contained within the engine crank case, in such a way that the running surfaces of the said pin can be lubricated by simple means, if necessary at a small pressure.

Thus, an aim is to provide crank pin lubricating means of a simple form which can be satisfactorily adopted in a high-speed internal combustion engine.

The aforementioned object is met in accordance with this invention by mounting on the big end of the connecting rod, a hollow scoop arranged to dip into the lubricating oil sump in the vicinity of the lower part of the circle of movement of the big end, this scoop having at least one opening thereinto which faces in the direction of movement of the big end and constitutes an inlet for the lubricating oil, and being furnished with means adapted, whenever the scoop is lifted out of the oil sump, to prevent at least some of the oil scooped up through the opening into the interior of the scoop from running out again through the said opening.

In accordance with a further feature of the invention, the hollow interior of the scoop may advantageously be brought into communication with an air venting duct, at least during the initial phase of each insertion of the scoop into the lubricating oil sump.

According to a still further feature of the invention, the hollow interior of the scoop is brought into communication, at least in the zone of the top dead centre of the connecting rod, with at least one channel adapted to receive oil for lubricating the running surface of the crank pin.

Conveniently, the scoop may have at least one pocket which is disposed above the inlet opening and is adapted to retain a measure of lubricating oil and prevent the latter from escaping through the said opening; alternatively, and for the same purpose, the scoop may be furnished with a non-return valve.

In order that the invention may be more clearly understood and readily carried into practical effect, specific examples thereof embodying the foregoing and other features will now be described with reference to the accompanying drawings, wherein, FIGURE 1 is a transverse sectional view, taken through a crank pin and the big end of a connecting rod, and illustrating the application thereto of one form of the crank pin lubricating means provided by the invention, the parts being shown at that phase in the crank shaft operation in which the scoop is dipped into the oil in the engine sump.

FIGURE 2 is a longitudinal sectional view of the same,

Like parts are designated by similar reference characters throughout the drawings.

Figure 3:
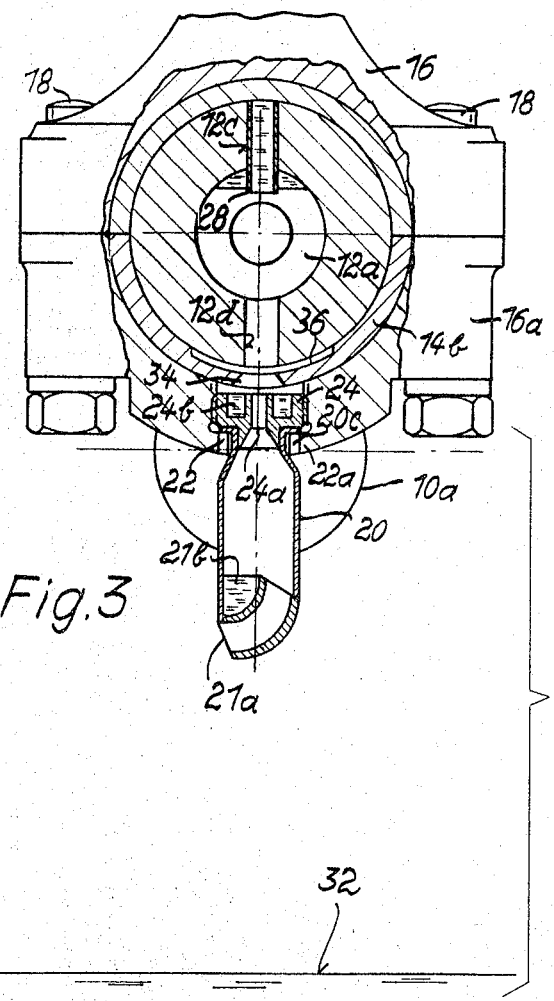
FIGURE 3 is a further transverse sectional view similar to FIGURE 1 but this time showing the crank pin at its top dead centre position and with the scoop raised clear of the oil.

In FIGURES 1 to 3, the crank shaft 10, which is mounted at 10a and 10b within the crank case (not shown) has only been partly illustrated. In practice, the said shaft may be either of integral construction or composed of a plurality of initially separate members which are rigidly united together. The connecting rod 16 is mounted on a crank pin 12 of the crank shaft through the intermediary of a two-part bearing shell 14a, 14b. The big end 16a of the connecting rod embracing the pin 12 is split horizontally in the middle, the resulting lower half 16a being rigidly secured by means of screws 18 to the main part 16. The articulation of the connecting rod to the crank shaft and its connection to the piston of an internal combustion engine are generally known and do not require to be described in any further detail.

To lubricate the cylindrical running surfaces of the crank pin 12, use is made of a lubricating means which, in accordance with the present invention, includes a scoop 20 mounted upon the big end 16a.

The scoop 20 comprises a thin-walled hollow component of rubber having at its upper end a flange 20a which bears against an annular rib 22a in a bore 22 formed in the connecting rod big end 16a. As shown, the lower part of the scoop 20 is laterally flattened and has inserted therein an open-ended pipe bend 21 which is secured in position, for example by welding. The pipe bend 21 is so arranged that its lower front opening constitutes an inlet 21a, whilst its opposite upwardly directed opening communicates with the interior of the scoop 20. A pocket 21b is thereby formed between the inner wall of the bend 21 and an outer wall of the scoop 20. The lateral flattening of the scoop is such that the sides of the latter are parallel to the plane of movement of the connecting rod. To enable the laterally flattened lower part of the scoop 20 to be passed through the wall of the lower half 16a of the big end during assembly, two opposed slits are formed in the annular rib 22a. A nut 24 screwed into a correspondingly tapped portion of the bore 22 in the big end 16a holds the scoop 20 in position with its inlet opening 21a always facing in the direction of circular movement of the big end. The nut 24 has therein an axial bore 24a and a co-axial circular groove 24b facing the crank pin 12.

The crank pin 12 has provided therein an axial bore 12a and a groove 12b into which latter is inserted a spring ring 26 (see FIGURE 2). A plurality of radially-extending ducts such as 12c and 12d in the crank pin 12 open into the axial bore 12a. The three similar ducts 12c are located one behind the other all at one side of the crank pin whilst the duct 12d is disposed at the diametrally opposite side of this pin. A small venting tube 28 is secured in the central one of the three ducts 12c whilst a similar but somewhat shorter tube 30 is secured in each of the remaining two ducts 12c. The central tube 28 projects somewhat further into the interior of the crank pin 12 than the two companion tubes 30.

Disposed below the connecting rod 16, at the bottom of the crank case (not shown) is the sump containing the lubricating oil. This oil in the sump is designated 32 and it is arranged that the oil surface shall not exceed a minimum and a maximum level 32a and 32b respectively (FIGURE 1).

When the engine is running the inlet opening 21a into the scoop 20 describes an elliptical path around the axis of the crank shaft 10, as indicated by the arrow in FIGURE 1. During each cycle of this movement the opening 21a dips into the lubricating oil 32.

During the phase of the movement in which the scoop 20 is passing into the oil sump 32, the resulting impact pressure forces a certain quantity of lubricating oil up through the inlet opening 21a into the interior of the scoop 20. At the same time air present in the scoop 20 escapes through the bore 24a in the nut 24, a tapered radial passage 34 and a groove 36 into the bearing shell 14b and from thence through the central venting tube 28 into the interior of the pin 12 and finally into the crank case. The height of the column of oil which is formed in the scoop during the immersion phase is dependent on the predetermined obstruction to flow in the scoop, the impact pressure and the components of centrifugal force counteracting the same.

As soon as the scoop 20 has been lifted out of the oil sump 32, the impact pressure ceases and the column of oil built up in the scoop is for the most part expelled to the exterior again through the inlet opening 21a under the effect of the still active components of centrifugal force. Only the quantity of oil in the pocket 21b remains in the scoop 20.

The centrifugal force (or its outwardly-directed component) which varies with the position of the crank pin 12 in the circular trajectory of the big end of the connecting rod, has the effect of throwing the quantity of oil, retained in the pocket 21b, against the said pin in the region of upper dead centre. Some of this outwardly-projected oil passes through the axial bore 24a and hits the outer surface of the bearing shell 14b whereupon it is trapped in the groove 24b. Also, oil thrown up from the pocket 21b by centrifugal force is projected through the tapered bore 34 and the duct 12d into the axial bore 12a of the crank pin 12.

During the ensuing rotary movements of the crank shaft the procedure described above, namely the scooping up of oil from the sump 32 through the inlet opening 21a into the pocket 21b and then the throwing up of this quantity of oil from the pocket 21b into the groove 24a and/or out of this groove and into the interior 12a of the crank pin 12 is repeated revolution after revolution.

The lubricating oil which is fed into the axial bore 12a of the crank pin 12 assists the centrifugal effect during the movement of the connecting rod 16. As a consequence the quantity of lubricating oil in the crank pin is subject to a centrifuging effect so that the bubbles of air in the oil are separated, during the centrifugal action, from the heavy particles of oil. The separated air, which collects at the centre of the crank pin escapes into the crank case through the lateral openings constituted by the open ends of the bore 12a, whilst the lubricating oil, together with other contaminating particles, collects in the vicinity of the tubes 28 and 30. The oil, cleaned in this way, passes through the shorter tubes 30 at the appropriate lubrication points and lubricates the running surface of the crank pin 12 in the bearing shell 14a, 14b of the connecting rod 16. Since the lubricating oil is forced to the lubricating points under centrifugal action, lubrication takes place at a pressure above atmospheric, so that the herein described lubricating means may advantageously be applied even to high-speed internal combustion engines, without making special demands on extra means, and with a very high efficiency.

In a case where the lubricating oil sump is of a substantial depth in the crank case, or where there is a very high demand for lubricating oil, a plurality of superimposed pockets such as 21b may be arranged in a single scoop 20 arranged to be filled through a single inlet opening 21a. Moreover, it is possible to use the scoop with arrangements other than that illustrated, for example in conjunction with a connecting rod of a unitary construction.

The introduction of a supply container for lubricating oil as constituted by the annular groove 24b in the vicinity of the running surfaces of the crank pin is of particular importance in connection with the cold starting of an internal combustion engine. In this event, the lubricating oil in the container 24b will be quickly warmed up by the heat engendered by the friction between the bearings, and will be rapidly forwarded to the lubrication point in the manner described above.

Figure 4:
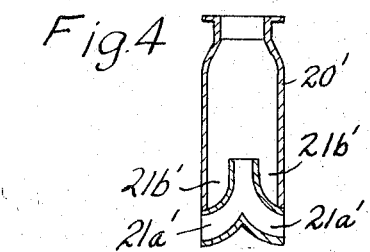
FIGURES 4 and 5 are detail views respectively illustrating two further practical forms of the scoop.
Figure 5:
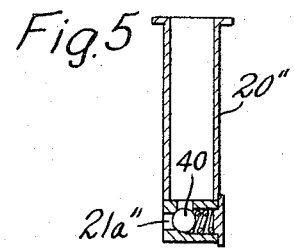

It is pointed out that faulty assembly of the scoop in the appropriate bore of the big end of the connecting rod can be prevented by providing in the scoop 20' (see FIGURE 4) two inlet openings 20a' and two pockets 21b' so that during the assembly no particular attention need be paid to the position of the inlet opening with respect to the direction of movement of the connecting rod. Moreover, for particular constructions it is possible to provide, instead of a pocket, a non-return valve such as 40 at the inlet opening 20a'' of the scoop 20'', as shown by FIGURE 5. This non-return valve fulfills the same function, inasmuch as it prevents complete expulsion of the lubricating oil through the inlet opening whenever the scoop is lifted out of the oil.

Finally, in regard to the construction illustrated in FIGURES 1–3, it would also be possible to insert within the axial bore 12a of the crank pin 12, a permanent magnet, for example in the form of a sleeve, preferably replaceable, which would retain the metal particles centrifuged out of the lubricating oil. In this construction, moreover, the lubricating tubes 30 may be arranged in the same transverse plane as the venting tube 28, and may be located in front of and/or behind the same.

I claim:
1. In an internal combustion engine, in combination, an oil sump; a rotary crank shaft having a crank pin eccentrically disposed with respect to its rotational axis, said shaft being arranged to rotate above said sump; and the crank pin having formed therein an axial bore constituting an oil reservoir and, communicating with said bore, a radial air venting duct, a radial oil supply channel adapted also to communicate with the interior of the scoop and at least one oil lubricating duct leading radially from the axial bore to the running surface of the crank pin; a connecting rod having a big end mounted upon and embracing said crank pin; a hollow scoop which is mounted on said big end and is arranged to dip into lubricating oil in the sump in the vicinity of the lower portion of the circle of movement of the big end, said scoop having at least one opening thereinto facing in the direction of movement of the big end and constituting an inlet for oil for use in lubricating the crank pin; and means within said scoop adapted, whenever the latter is lifted out of oil in the sump, to prevent at least some of the oil scooped up through the inlet from running out of the inlet again; the construction and arrangement being such that at least during the initial phase of each insertion of the scoop into the oil sump the hollow interior of the scoop moves into communication with the air venting duct whereas at least in the zone of the top dead centre of the connecting rod the said hollow interior of the scoop is brought into communication with the oil supply channel by which oil is fed into the axial bore in the crank pin by centrifugal force and from thence through the one or more oil lubricating ducts to the running surface of the crank pin, the inner end of said air venting duct extending radially inwardly of the axial bore surface so as to terminate inwardly of the normal level of the oil therein.

2. In an internal combustion engine, in combination, an oil sump; a rotary crank shaft having a crank pin eccentrically disposed with respect to its rotational axis, said shaft being arranged to rotate above said sump, and the crank pin having formed therein an axial bore and a plurality of radial ducts disposed to lead into said axial bore from the outer surface of said crank pin; a connecting rod having a big end mounted upon and embracing said crank pin; a hollow scoop which is mounted on said big end and is arranged on said big end and is arranged to dip into lubricating oil in the sump in the vicinity of the lower portion of the circle of movement of the big end, said scoop having at least one opening thereinto facing in the direction of movement of the big end and constituting an inlet for oil for use in lubricating the crank pin, and means within said scoop adapted, whenever the latter is lifted out of oil in the sump, to prevent at least some of the oil scooped up through the inlet from running out of the inlet again, the construction and arrangement being such that the radial ducts provide communication with the interior of the scoop, one of these ducts being located to serve as an air venting passage from said scoop to said axial bore during the phase of movement in which the scoop dips into the oil and another serving as a lubricating channel at least during the movement phase in which the scoop is being caused to rise out of the oil.

3. Apparatus according to claim 2, wherein one side of the crank pin has formed therein a plurality of radial ducts extending from the outer cylindrical surface of the said pin to the surface of the axial bore therein, and small tubes are fitted into these ducts, the tube in the particular duct which serves as said air venting passage extending into the axial bore to a greater extent than the remaining tubes, and the diametrally opposite side of the crank pin has formed therein a radial duct constituting a channel through which oil from the scoop is fed into the axial bore, the inner end of the tube in the air venting duct standing above the level of oil collected within the said bore whilst the inner ends of the tubes fitted in the remaining relevant ducts are located within the said collected oil whereby the last mentioned tubes transmit such oil from the axial bore to the running surface of the crank pin.

4. A combination according to claim 2, wherein the scoop has provided therein two oppositely facing inlet openings both leading into the interior thereof.

5. In an internal combustion engine, an oil sump; a rotary crank shaft having a crank pin eccentrically disposed with respect to its rotational axis, said shaft being arranged to rotate above said sump; a connecting rod having a big end mounted upon and embracing said crank pin; a hollow lubricating oil scoop mounted on said big end for dipping into the lubricating oil in said sump during the lower portion of the circle of movement of said big end, said scoop having at least one opening thereinto facing in the direction of movement of the big end and constituting an inlet for oil for use in lubricating the crank pin, and means within said scoop adapted, whenever the latter is lifted out of oil in the sump, to prevent at least some of the oil scooped up through the inlet from running out of the inlet again; an axial bore in said crank pin forming an oil collector space which is vented to the space above said oil sump; a connecting bore in said crank pin extending radially from said collector space to the outer surface of said crank pin for passing oil from said scoop to said collector space under centrifugal force during the upper portion of the circle of movement of said big end; means forming a venting passage in said crank pin extending radially outwardly from said collector space substantially diametrically opposite said connecting bore to the outer surface of said crank pin for ventingly communicating said scoop and said collector space during the lower portion of the circle of movement of said big end, the inner end of said venting passage projecting into said collector space above the level of oil therein; and at least one lubricating bore in said crank pin extending from said collector space substantially diametrically opposite said connecting bore radially outwardly to the surface of said crank pin for conveying oil under centrifugal force from said collector space to the outer surface of said crank pin.

6. Apparatus according to claim 5 further comprising means extending the inner end of said lubricating bore inwardly beyond the surface of said collector space but below the level of the oil in said collector space.

7. Apparatus according to claim 6 wherein a plurality of said lubricating bores are arranged immediately adjacent said venting passage.

References Cited by the Examiner

UNITED STATES PATENTS

| | | | |
|---|---|---|---|
| 787,654 | 4/1905 | Allmond | 184—63 |
| 1,392,592 | 10/1921 | Nelson et al. | 184—11 |
| 1,528,171 | 3/1925 | Tokarczike | 184—11 |
| 2,050,723 | 8/1936 | McMillin | 184—11 |

LAVERNE D. GEIGER, *Primary Examiner.*

SAMUEL ROTHBERG, *Examiner.*

H. S. BELL, *Assistant Examiner.*